United States Patent
Adiyapatham et al.

(10) Patent No.: US 8,347,147 B2
(45) Date of Patent: Jan. 1, 2013

(54) LIFECYCLE MANAGEMENT OF AUTOMATED TESTING

(75) Inventors: Pandiyan Adiyapatham, Bangalore (IN); Vivek Devarajan, Bangalore (IN); Sfoorti Singhania, Bangalore (IN); Rooth Joshwa, Bangalore (IN); Mukil Krishna M, Trivandrum (IN); Shashank Murthy S.N, Bangalore (IN)

(73) Assignee: Wipro Limited, Bangalore, Karnataka (IN)

( * ) Notice: Subject to any disclaimer, the term of this patent is extended or adjusted under 35 U.S.C. 154(b) by 562 days.

(21) Appl. No.: 12/399,982

(22) Filed: Mar. 9, 2009

(65) Prior Publication Data

US 2010/0229155 A1 Sep. 9, 2010

(51) Int. Cl.
*G06F 11/00* (2006.01)
(52) U.S. Cl. .................. 714/38.1; 717/124
(58) Field of Classification Search .......... None
See application file for complete search history.

(56) References Cited

U.S. PATENT DOCUMENTS

| | | | |
|---|---|---|---|
| 6,694,509 B1 * | 2/2004 | Stoval et al. | 717/124 |
| 7,296,188 B2 * | 11/2007 | Paternostro et al. | 714/38 |
| 7,493,521 B1 * | 2/2009 | Li et al. | 714/38 |
| 2004/0107415 A1 * | 6/2004 | Melamed et al. | 717/124 |
| 2006/0123389 A1 * | 6/2006 | Kolawa et al. | 717/101 |
| 2007/0006038 A1 * | 1/2007 | Zhou | 714/38 |
| 2008/0222608 A1 * | 9/2008 | Gartner et al. | 717/124 |
| 2009/0249297 A1 * | 10/2009 | Doshi et al. | 717/124 |

* cited by examiner

*Primary Examiner* — Christopher McCarthy
(74) *Attorney, Agent, or Firm* — Prakash Nama; Global IP Services, PLLC (57) ABSTRACT

Systems and methods for lifecycle management of automated testing are disclosed. In one embodiment, a method includes processing multiple manual test cases for an application under test, associating a set of reusable test scripts to the manual test cases, where the set of reusable test scripts is selected from a library of reusable test scripts, and executing the set of reusable test scripts for the application under test using an automated testing tool associated with the set of reusable test scripts.

19 Claims, 10 Drawing Sheets

ROI REPORT REQUEST 702

704 — SELECT THE ORGANIZATION UNIT : ORG1

☑ PROJ1

706 — ENTER THE MANUAL EFFORT BILLING RATE : 35 ($)

708 — ENTER THE START DATE : 09/2008 (MM/YYYY)

710 — ENTER THE END DATE : 12/2008 (MM/YYYY)

712 — E-MAIL (SEPARATE EMAIL IDS WITH ';') : PAUL.KB@XYZ.COM

SUBMIT

GENERATED ROI REPORT 714

FILE  EDIT  VIEW  INSERT  FORMAT  TOOLS  DATA  WINDOW  HELP

ARIAL    10    B  I  U

C18    fx

| | A | B | C | D | E | F | G | H |
|---|---|---|---|---|---|---|---|---|
| 1 | PROJECT NAME 716 | MONTH 718 | EFFORT SAVED (HRS) 720 | MANUAL TESTING RATE 722 | AMOUNT SAVED 724 | AMOUNT INVESTED 726 | ROI (%) 728 | |
| 2 | PROJ1 | SEP, 2008 | 2.25 | 35.0 | 78.75 | 1000 | 7.875 | |
| 3 | PROJ1 | OCT, 2008 | 4.5 | 35.0 | 157.5 | 1000 | 15.75 | |
| 4 | PROJ1 | NOV, 2008 | 6.75 | 35.0 | 236.25 | 1000 | 23.625 | |
| 5 | PROJ1 | DEC, 2008 | 9.0 | 35.0 | 315.0 | 1000 | 31.5 | |
| 6 | | | | | | | | |

LIFECYCLE MANAGEMENT OF AUTOMATED TESTING

FIELD OF TECHNOLOGY

Embodiments of the present invention relate to the field of automated testing. More particularly, embodiments of the present invention relate to lifecycle management of automated testing.

BACKGROUND

Software needs to be tested before it is delivered. For example, several features of an application under test (AUT) may be manually executed, and the results may be compared with their expected outcomes. Although the application can be tested manually, the recent trend is moving toward automated testing. Commonly, automated testing involves automating a manual process already in place that uses a formalized testing process. Record and playback features of conventional automated testing tools (e.g., HP QTP®, IBM RFT®, etc.) may capture and record the user's actions or manual testing steps to generated test scripts, which may be used later for automatic testing of the application under test.

However, as an application changes to adopt new features or functionalities, the test scripts may need to be updated or rewritten from scratch, thus ensuing in high maintenance costs. As for the maintenance of the test scripts, it has become harder to acquire test automation experts due to growing demands and increasing complexities in applications in general. Furthermore, as test automation projects for an organization or company spread across different geographical locations, business units, and/or various domains, it has become even more difficult to manage the test automation projects using the conventional automated testing tools.

SUMMARY

Systems and methods of lifecycle management of automated testing are disclosed. In one aspect, a method for lifecycle management of automated testing comprises processing multiple manual test cases for an application under test, associating a set of reusable test scripts to the manual test cases, where the set of reusable test scripts is selected from a library of reusable test scripts, and executing the set of reusable test scripts for the application under test using an automated testing tool associated with the set of reusable test scripts.

In another aspect, a method for lifecycle management of automated testing comprises presenting a guideline to generate multiple manual test cases for an application under test, accessing a library of reusable test scripts for an automated testing tool to select a set of reusable test scripts which correspond to the manual test cases from the library when the automated testing tool is selected from a number of licensed automated testing tools, and setting respective parameters for the set of reusable test scripts, and executing the set of reusable test scripts for the application under test using the automated testing tool.

The methods disclosed herein may be implemented in any means for achieving various aspects, and may be executed in a form of a machine readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 6 illustrates an exemplary graphical user interface for the development module of FIG. 1, according to one embodiment.

Other features of the present embodiments will be apparent from the accompanying drawings and from the detailed description that follows.

DETAILED DESCRIPTION

Systems and methods of lifecycle management of automated testing are disclosed. Embodiments of the present invention include test automation lifecycle management features and a guided engineering technique at each stage of test automation using reusable test scripts. Thus, the systems and methods maximize return on investment, ensure cross project reusability, empower non-automation experts to create automation test suites, ensure uniformity in automation approach across the organization, and/or provide a set of guidelines and best practices for the test automation.

In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
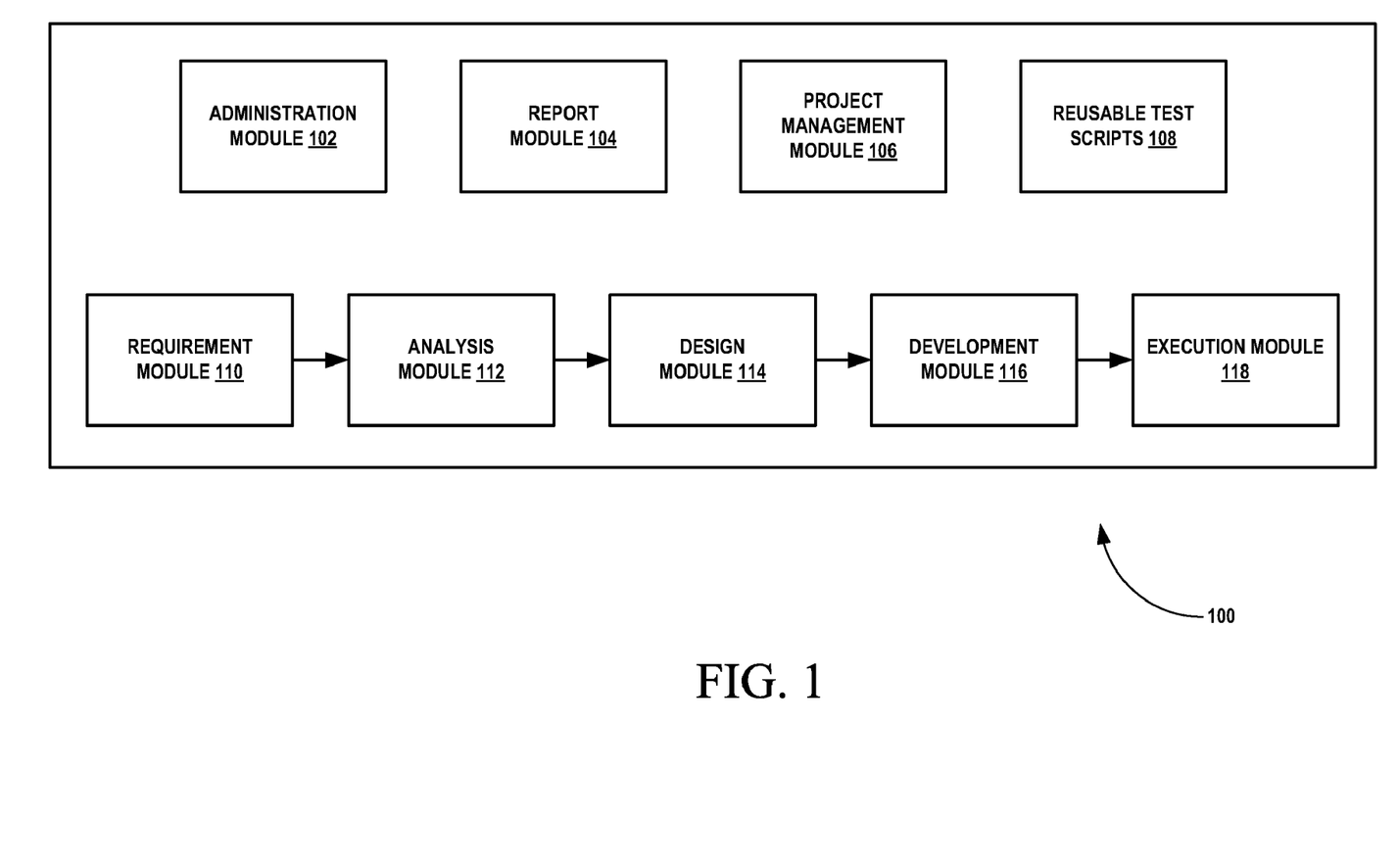
FIG. 1 is a block diagram which illustrates an exemplary lifecycle management of automated testing, according to one embodiment.

FIG. 1 illustrates an exemplary system 100 for lifecycle management of automated testing, according to one embodiment. In FIG. 1, the system 100 comprises an administration module 102, a report module 104, a project management module 106, reusable test scripts 108, a requirement module 110, an analysis module 112, a design module 114, a development module 116, and an execution module 118.

The administration module 102 may be used to perform administrative functions. For example, it can be used to maintain records for employees, control the scheduling of automated testing and resources, and/or produce management and operational reports. The report module 104 may be used to report the quality of ongoing or completed automated testing projects and/or the qualities of application under tests (AUT). The project management module 106 may be used to centrally allocate available resources (e.g., experts, licensed automated testing tools, etc.) to one or more automated testing projects and manage their progresses. The reusable test scripts 108 may include component codes which can be readily used or need some modifications to create an automated test scenario of multiple test cases. It is appreciated that a test case describes a test that needs to be run on the application under test to verify that the application under test runs as expected.

The system 100 also comes with in-built guidance at every stage of automation which is realized by the requirement module 110, the analysis module 112, the design module 114, the development module 116, and the execution module 118. The guideline may offer the best practices of test automation. The requirement module 110 may be used to capture various types of technical requirements needed for test automation. The analysis module 112 may be used to analyze a user's responses to the technical requirements from the requirement module 110. The design module 114 may be used to maintain reusable test scripts used for automated testing. The development module 116 may be used to build a test scenario by associating some of the reusable test scripts 108 to test cases used to build the test scenario. The execution module 118 may be used to execute the test scenario using a licensed automated testing tool (e.g., HP QTP®, IBM RFT®, etc.).

In one embodiment, a method for lifecycle management of automated testing comprises presenting a guideline across the automated testing modules which includes the requirement module 110, the analysis module 112, the design module 114, the development module 116, and the execution module 118, to generate multiple manual test cases for an application under test. The method also comprises accessing a library of reusable test scripts for an automated testing tool to select a set of reusable test scripts which correspond to the manual test cases when the automated testing tool is selected from a number of licensed automated testing tools. The method further comprises setting respective parameters for the set of reusable test scripts, and executing the set of reusable test scripts for the application under test using the automated testing tool.

Figure 2:
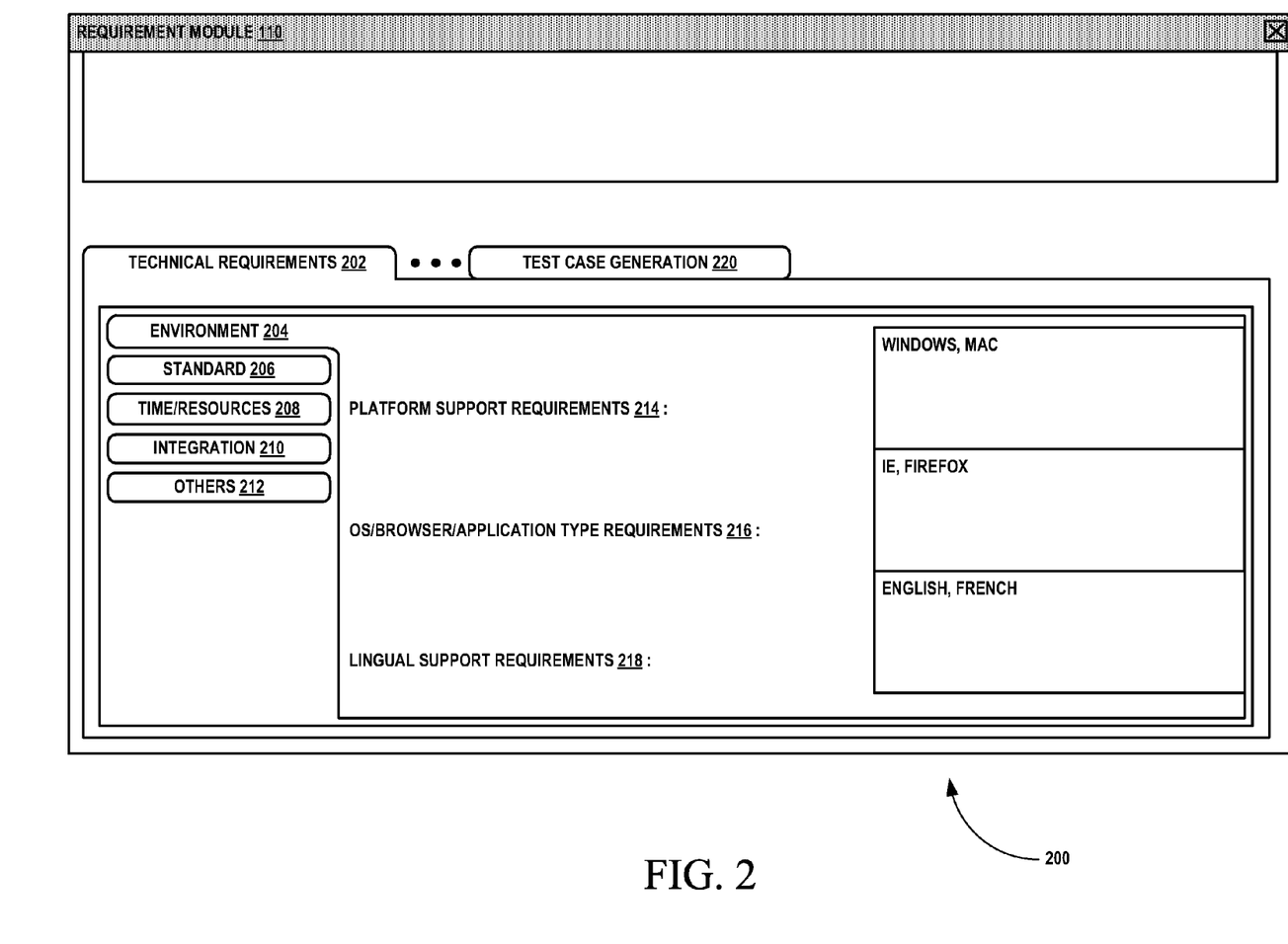
FIG. 2 is an exemplary graphical user interface of the requirement module of FIG. 1, according to one embodiment.

FIG. 2 is an exemplary graphical user interface (GUI) 200 of the requirement module 110 of FIG. 1, according to one embodiment. The GUI 200 may be used to capture test automation requirements of an application under test. In one exemplary implementation, the requirement module 110 may solicit a user's input to technical requirements 202 of the application under test. The technical requirements 202 may comprise an environment 204, a standard 206, a time/resource 208, an integration 210, and/or others 212.

One or more questionnaire items in the environment 204 solicit the user's responses on the environment (e.g., platform support requirements 214, OS/browser/application type requirements 216, lingual support requirements 218, etc.) in which the test is expected to run. The standard 206 solicits the user's responses on the requirements for maintenance (e.g., maintain from multiple places) and execution (e.g., execute locally or from a remote location). The time/resources 208 may solicit the user's responses on available licenses, skill levels of people, and/or organization of the test automation project. The integration 210 may solicit the user's responses on the project's integration with various entities. It is appreciated that there could me more items (e.g., others 212) on the technical requirements. As will be illustrated in detail in FIG. 5, a test case generation 220 may be used to generate new manual test cases or import from existing manual test cases.

Figure 3:
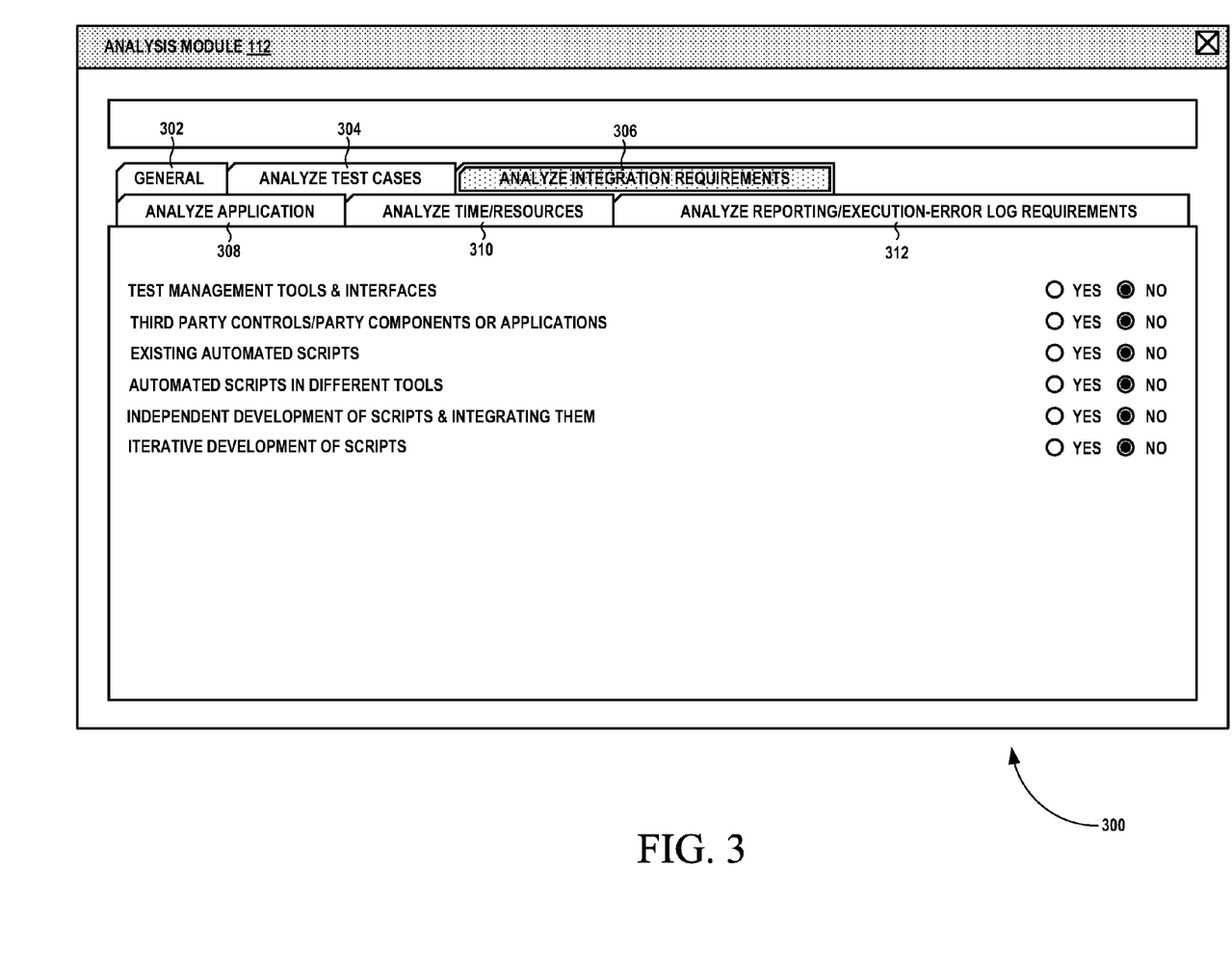
FIG. 3 is an exemplary graphical user interface for the analysis module of FIG. 1, according to one embodiment.

FIG. 3 is an exemplary graphical user interface (GUI) 300 of the analysis module 112 of FIG. 1, according to one embodiment. The GUI 300 may be used to analyze the user's responses to the requirement module 110 of FIG. 1. This is done by presenting a pre-built check list of automation analysis parameters that enables creation of a suitable design, development, and execution strategy for the automation project. As illustrated in FIG. 3, the GUI 300 may present a menu which includes a general 302, analyze test cases 304, analyze integration requirements 306, analyze application 308, analyze time/resources 310, and/or analyze reporting/execution-error log requirements 312.

Figure 4:
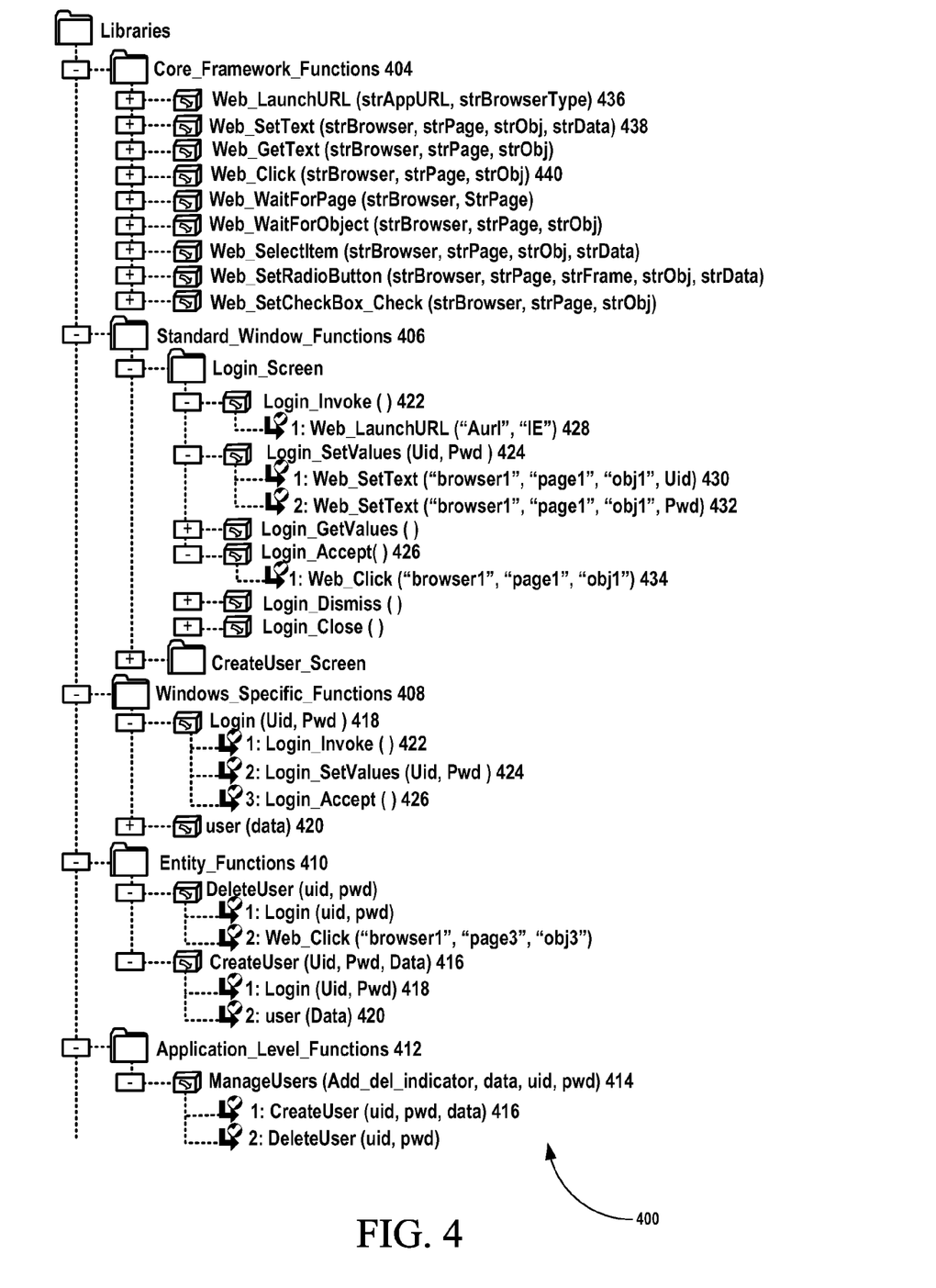
FIG. 4 illustrates exemplary libraries of reusable test scripts associated with the design module of FIG. 1, according to one embodiment.

FIG. 4 illustrates exemplary libraries 400 of reusable test scripts associated with the design module 114 of FIG. 1, according to one embodiment. The design module 114 may be used to create the libraries where the components or reusable test transcripts may be created using one or more automating tools (HP QTP®, IBM RFT®, etc.). Then, the contents of the entire libraries 400 can be exported into a single file, or the components may be exported into individual files. When the components or reusable test scripts are uploaded to the system 100 of FIG. 1, their codes may be checked for errors. In an alternative embodiment, as the case base or script comprising functions is uploaded into the system 100, the libraries or the reusability design may be created from the script.

In one exemplary implementation, the libraries 400 may be in multiple levels or layers. For example, the libraries 400 may comprise five levels—core framework functions 404, standard window functions 406, windows specific functions 408, entity functions 410, and application level functions 412. As illustrated in FIG. 4, the application levels functions 412, the entity functions 410, the windows specific functions 408, the standard window functions 406, and the core framework functions 404 include reusable components or test scripts that depend on each other. Thus, manageusers 414 of the application level functions 412 includes createuser 416 of the entity functions 410. In addition, the createuser 416 of the entity functions 410 includes login 418 and user 420 of the windows specific functions 408. Then, the login 418 of the windows specific functions 408 includes login_invoke 422, login_setvalues 424, and login_accept 426. Also, the login_invoke 422, the login_setvalues 424, and the login_accept 426 of the standard window functions 406 include web_launchURL 428, web_settext 430 and 432, and web_click 434, respectively. Furthermore, the web_launchURL 428 of the standard windows functions 406 depend on web_launchURL 436, the web_settext 430 and 432 to web_settext 438, and the web_click 434 to web_click 440 of the core framework functions 404.

With the layered structure of the libraries 400, the user may identify a layer or level where modification to a particular reusable test script needs to be made. For instance, if more fundamental changes to test scripts need to be made, reusable test scripts at the core frame work functions 404 may be modified. Additionally, the reusable test scripts may be divided into two sections, one that does not require any GUI application (e.g., business flow testing operations) and the other that require one or more GUI applications (e.g., functions that interact with GUI). This design approach may minimize changes or modifications to the reusable test scripts for automated testing projects, thus reducing the maintenance efforts and costs of the testing.

Figure 5:
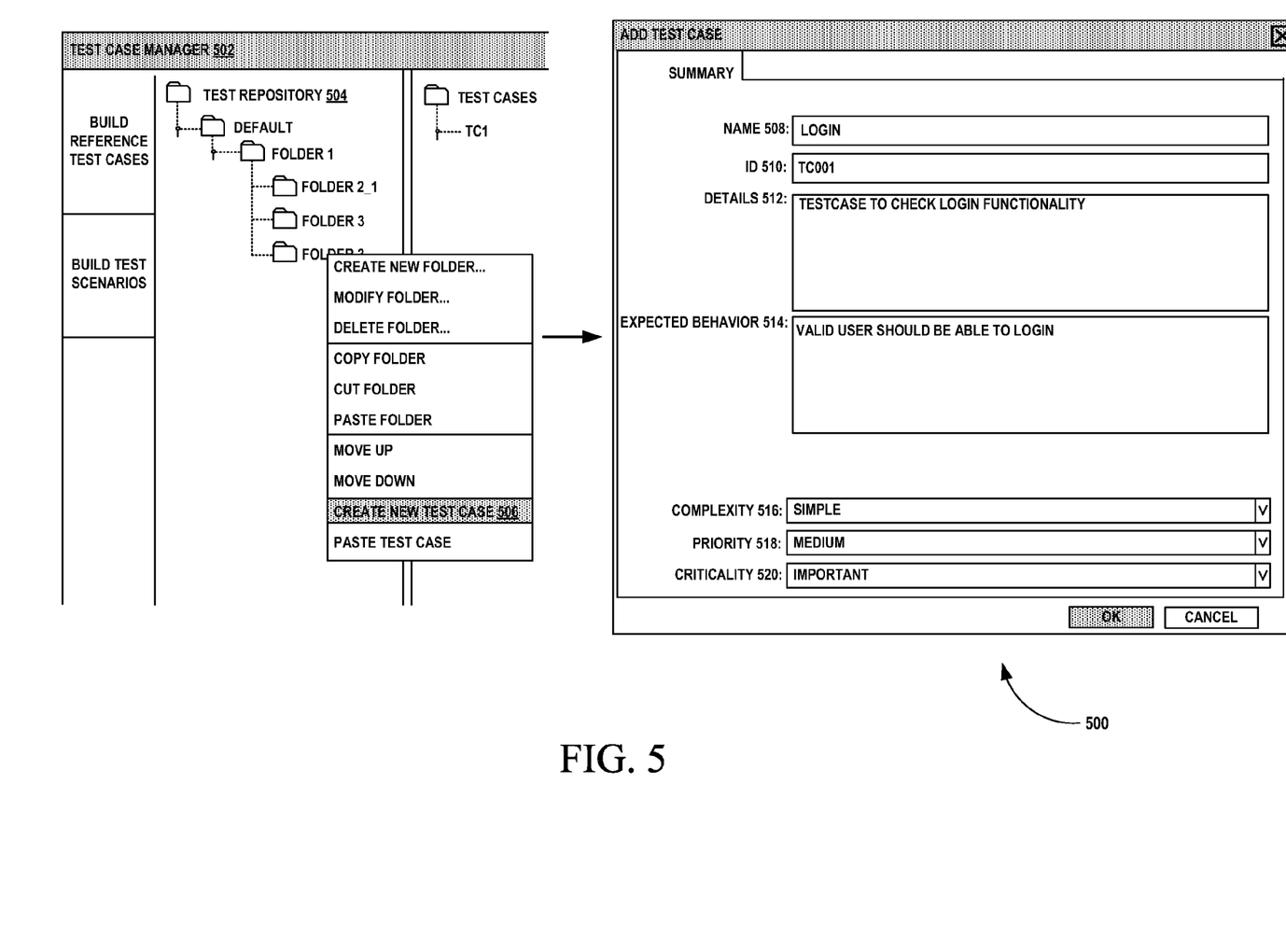
FIG. 5 illustrates an exemplary process for creating new test cases, according to one embodiment.

FIG. 5 illustrates an exemplary process 500 for creating new test cases, according to one embodiment. In FIG. 5, a test case manager 502 may be a graphical user interface for creating one or more test cases (e.g., manual test cases). A test repository 504 may be used to store the test cases. From a drop down menu, the user may click "create new test cases 506. Then, a dialog window may be displayed requiring the user's input, such as name 508 (e.g., "login"), ID 510 (e.g., "tc001"), details 512 (e.g., "test case to check login functionality", expected behaviour 514 (e.g., "valid user should be able to login"), complexity 516 (e.g., "simple"), priority 518 (e.g., "medium"), and criticality 520 (e.g., "important"). Once the test case is created, it is stored in a folder of the test repository 504. In an alternative embodiment, one or more test cases may be imported from existing test cases.

FIG. 6 illustrates an exemplary graphical user interface (GUI) 600 for the development module 116 of FIG. 1, according to one embodiment. The GUI 600 is used to create a test scenario 602 based on multiple test cases 604. Each of the test cases 604 may include several test steps 606. Then each step 606 may be matched with a reusable test script. Once the process is completed, the test scenario 602 may be ready for execution.

In FIG. 6, the test scenario 602, "notepad_type_close," includes two test cases, TC1 and TC2. TC1 is based on two test steps 606 with step numbers 608 TS1 and TS2, whereas TC2 is based on six test steps with step numbers 608 TS1-TS6. Each of the steps is described with a step description 610, and its expected result 612 is listed as well. Furthermore, a keyword 614 is used to match a particular reusable test script to a test case (e.g., or its test step). Then, param 1 616 and param 2 618 may be used to set parameter values. Additionally, an edit test step dialog 620 may be used to edit one or more of the test steps 606. In the dialog box, TS1 of TC2 is used to associate reusable test script "web_invoke" from the core framework functions of the libraries 400 using a select library 622 and a select function 626 menus. Then, parameter values 624 associated with the test step may be set.

Figure 7:
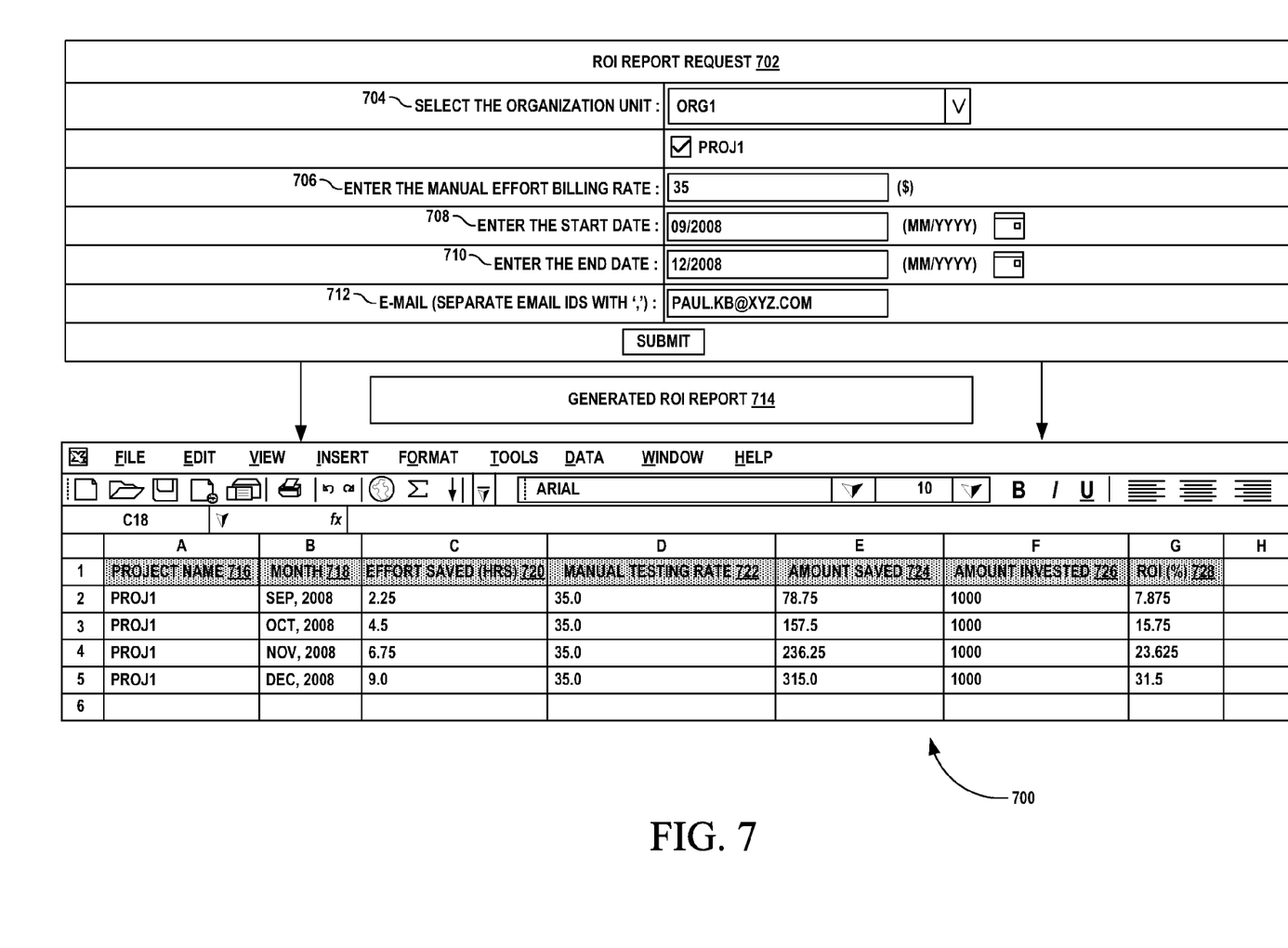
FIG. 7 illustrates an exemplary view of a return on investment (ROI) report, according to one embodiment.

FIG. 7 illustrates an exemplary view of a return on investment (ROI) report 714, according to one embodiment. In FIG. 7, a ROI report request 702 may be used to process a user's request for the ROI report 714. For the request 702, the user is request to fill out the user's organization unit 704, manual effort billing rate 706 associated with the test automation project, start date 708, end date 710, and e-mail address 712. Then, the ROI report 714 is forwarded to the user in response to the ROI report request 702 to inform the user about the usage of the automated testing scripts using different automated testing tools, where the report includes a project name 716, month 718, effort saved in hours 720, manual testing rate 722, amount saved 724, amount invested 726, and return on investment in percentage 728.

Figure 8:
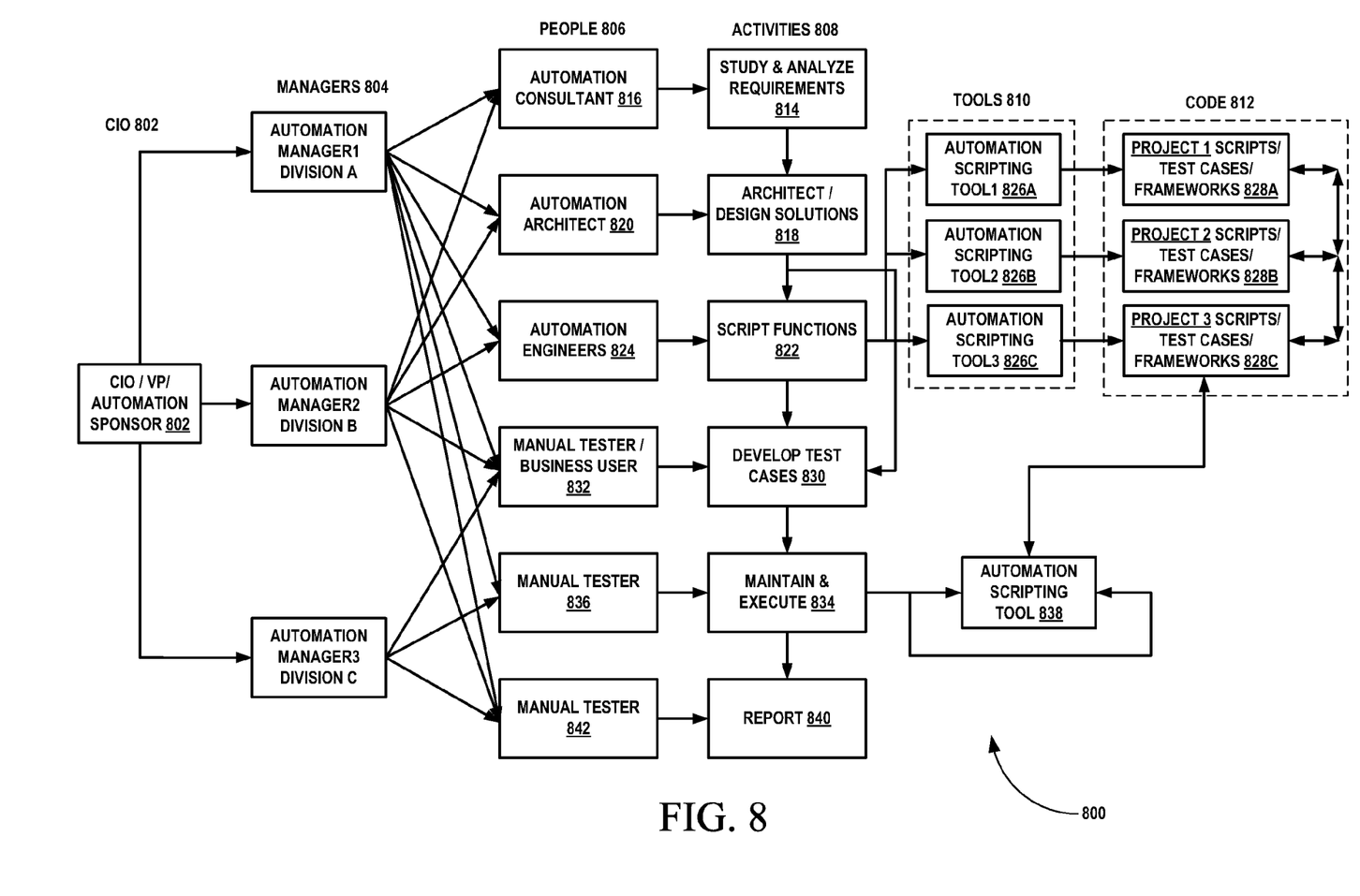
FIG. 8 illustrates an exemplary lifecycle management system for automated testing, according to one embodiment.

FIG. 8 illustrates an exemplary lifecycle management system 800 for automated testing, according to one embodiment. The lifecycle management system 800 allows the distribution of tasks on the basis of expertise of its people 806. Thus, design of the automation workflow (e.g., via activities 808 which include study & analyze requirements 814, architect/design solution 818, script functions 822, develop test cases 830, maintain & execute 834, and report 840) may be assigned more methodically.

For example, a chief information office (CIO) 802 may appoint managers 804 (e.g., automation manager 1—division A, automation manager 2—division B. automation manager 3—division C) for multiple test automation tasks. Each manager then assigns tasks for the project to one or more of the people 806 according to their expertise. In FIG. 8, the task of the study & analyze requirements 814 is assigned to an automation consultant 816 (e.g., using the requirement module 110 and the analysis module 112 of FIG. 1), the architect/design solution 818 to an automation architect 820 (e.g., using the design module 114), and the script functions 822 to automation engineers 824 (e.g., using the design module 114 & tools 810). Once the script functions 822 are performed using the tools 810, code 812 may be generated. As illustrated in FIG. 8, scripts/test cases/frameworks 828A may be generated by processing the script functions 822 using automation scripting tool 1 826A, scripts/test cases/frameworks 828B using automation scripting tool 2 826B, and scripts/test cases/frameworks 828C using automation scripting tool 3 826C.

Then, the task of the develop test cases 830 is assigned to a manual tester/business user 832, and a manual tester 836 may be assigned to perform the task of the maintain & execute 834 using an automation scripting tool 838. The same tester 836 or another tester 842 may be assigned to perform a task of the report 840. Thus, the lifecycle management system 800 may define ongoing automation projects in a single console in a hierarchical tree view. In addition, it may provide a standard list of automation tasks that can be assigned, tracked, or reassigned by project managers for single or multiple projects. Furthermore, the lifecycle management system 800 may encompass a facility to assign specific users to certain tasks, and define their role requirements and privileges. Moreover, the lifecycle management system 800 may have in-built reports for test automation status and application quality reports which can be viewed any location.

Figure 9:
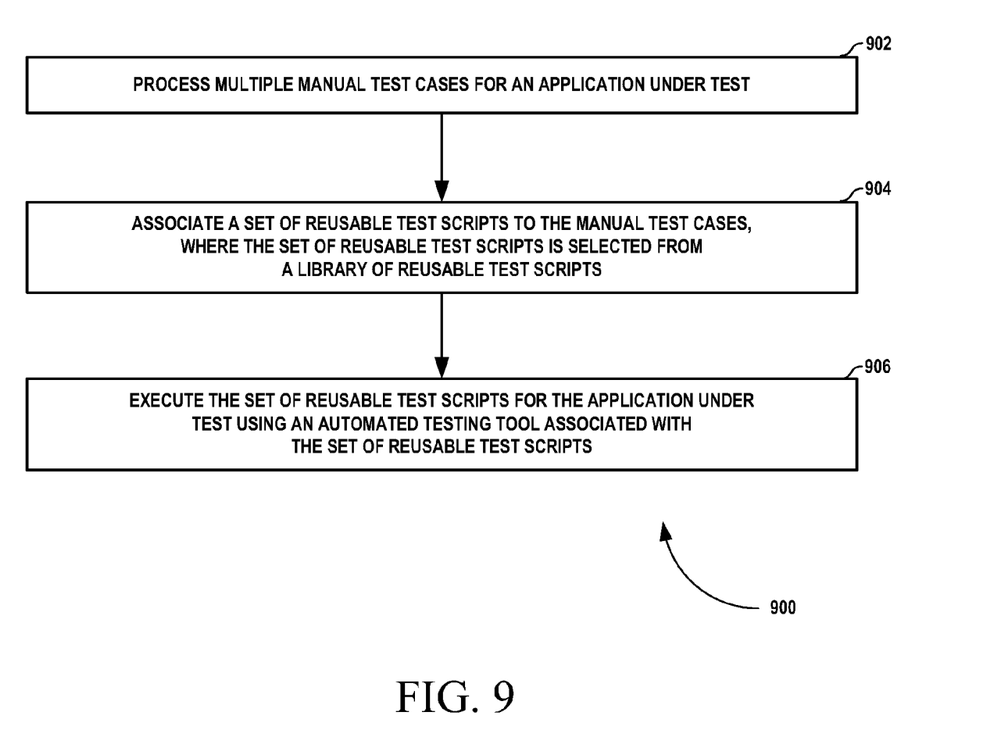
FIG. 9 is a process flow chart of an exemplary method for lifecycle management of automated testing, according to one embodiment.

FIG. 9 is a process flow chart 900 of an exemplary method for lifecycle management of automated testing, according to one embodiment. In operation 902, multiple manual test cases for an application under test are processed. In one embodiment, a guideline for generating the multiple test cases may be presented during the operation, where the guideline may include a list of technical requirements for testing the application under test and a list of questionnaires for analyzing a user response to the list of technical requirements. The manual test cases may be imported from existing manual test cases, or they may be newly created.

In operation 904, a set of reusable test scripts is associated to the manual test cases, where the set of reusable test scripts is selected from a library of reusable test scripts. In one embodiment, the library of reusable test scripts for the automated testing tool may be accessed when the automated testing tool is selected from a number of licensed automated testing tools. In addition, respective parameters for the set of reusable test scripts may be set. Furthermore, the library of reusable test scripts may be in multiple levels for easy maintenance of the reusable test scripts, where the multiple levels may include a field level, a window level, a module level, and an application functionality level.

In operation 906, the set of reusable test scripts (e.g., or a test scenario) for the application under test is executed using an automated testing tool associated with the set of reusable test script, if the set of reusable test scripts at the field level is generated using the automated testing tool.

It is appreciated that the methods disclosed herein may be executed in a form of a machine readable medium embodying a set of instructions that, when executed by a machine, cause the machine to perform any of the operations disclosed herein.

Figure 10:
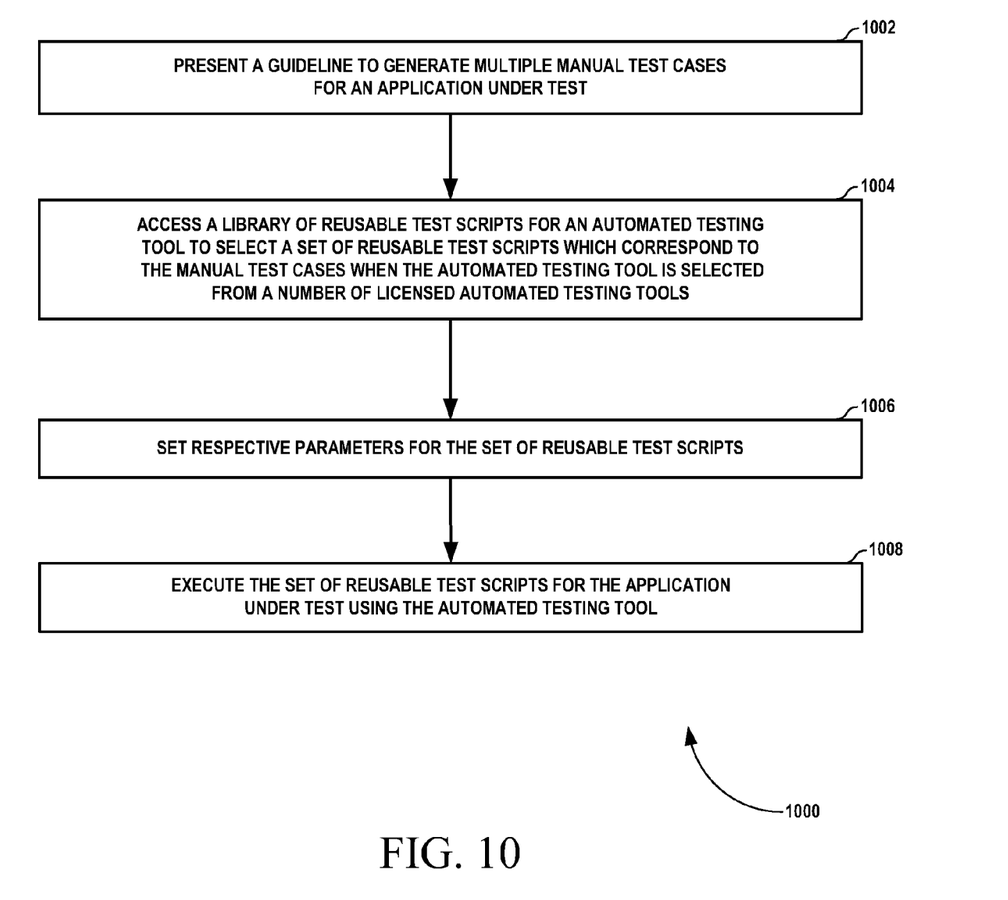
FIG. 10 is a process flow chart of another exemplary method for lifecycle management of automated testing, according to one embodiment.

FIG. 10 is a process flow chart 1000 of another exemplary method for lifecycle management of automated testing, according to one embodiment. In operation 1002, a guideline is presented to generate multiple manual test cases for an application under test. In operation 1004, a library of reusable test scripts for an automated testing tool is accessed to select a set of reusable test scripts which correspond to the manual test cases when the automated testing tool is selected from a number of licensed automated testing tools. In operation 1006, respective parameters for the set of reusable test scripts are set. In operation 1008, the set of reusable test scripts is executed for the application under test using the automated testing tool.

It is appreciated that the methods disclosed herein may be executed in a form of a machine readable medium embodying a set of instructions that, when executed by a machine, cause the machine to perform any of the operations disclosed herein.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated ASIC circuitry).

What is claimed is:

1. A method for lifecycle management of automated testing, comprising:
    processing a plurality of manual test cases for an application under test;
    associating a set of reusable test scripts to the plurality of manual test cases, wherein the set of reusable test scripts is selected from a library of reusable test scripts, wherein the library of reusable test scripts is accessed for an automated testing tool when the automated testing tool is selected from a number of licensed automated testing tools;
    executing the set of reusable test scripts for the application under test using the automated testing tool associated with the set of reusable test scripts;
    displaying automated testing projects which include the automated testing of the application under test; and
    displaying a return on investment (ROI) for each of the automated testing projects.

2. The method of claim 1, wherein the processing the plurality of manual test cases comprises presenting a guideline for generating the plurality of manual test cases.

3. The method of claim 2, wherein the guideline comprises a list of technical requirements for testing the application under test.

4. The method of claim 3, wherein the guideline comprises a list of questionnaires for analyzing a user response to the list of technical requirements.

5. The method of claim 1, wherein the associating the set of reusable test scripts further comprises setting respective parameters for the set of reusable test scripts.

6. The method of claim 1, wherein at least one of the plurality of manual test cases is imported from existing manual test cases.

7. The method of claim 1, wherein at least one of the plurality of manual test cases is newly created.

8. The method of claim 1, wherein the automated testing projects which include the automated testing of the application under test are displayed in a hierarchical tree view.

9. The method of claim 8, wherein the lifecycle management of the automated testing comprises displaying a standard list of automation tasks controlled by at least one project manager for the automated testing projects.

10. The method of claim 8, wherein the lifecycle management of the automated testing comprises defining specific users and their role requirements and privileges for the automated testing projects.

11. The method of claim 8, wherein the lifecycle management of the automated testing comprises forwarding a status report for each automated testing project and a quality report for each application under test.

12. A method for lifecycle management of automated testing, comprising:
    processing a plurality of manual test cases for an application under test;
    associating a set of reusable test scripts to the plurality of manual test cases, wherein the set of reusable test scripts is selected from a library of reusable test scripts, wherein the library of reusable test scripts is in multiple levels for easy maintenance of the reusable test scripts; and
    executing the set of reusable test scripts for the application under test using an automated testing tool associated with the set of reusable test scripts.

13. The method of claim 12, wherein the multiple levels comprise a field level, a window level, a module level, and an application functionality level.

14. The method of claim 13, wherein each reusable test script at the field level is generated using the automated testing tool.

15. A method for lifecycle management of automated testing, comprising:
    processing a plurality of manual test cases for an application under test;
    associating a set of reusable test scripts to the plurality of manual test cases, wherein the set of reusable test scripts is selected from a library of reusable test scripts;
    executing the set of reusable test scripts for the application under test using an automated testing tool associated with the set of reusable test scripts;
    displaying automated testing projects which include the automated testing of the application under test in a hierarchical tree view; and
    displaying a return on investment (ROI) for the each automated testing project.

16. A method for lifecycle management of automated testing, comprising:
    presenting a guideline to generate a plurality of manual test cases for an application under test;
    accessing a library of reusable test scripts for an automated testing tool to select a set of reusable test scripts which correspond to the plurality of manual test cases when the automated testing tool is selected from a number of licensed automated testing tools, wherein the library of reusable test scripts is in multiple levels for easy maintenance of the reusable test scripts;
    setting respective parameters for the set of reusable test scripts; and
    executing the set of reusable test scripts for the application under test using the automated testing tool.

17. The method of claim 16, wherein at least one of the plurality of manual test cases is newly created or imported from existing manual test cases.

18. A non-transitory computer readable medium for lifecycle management of automated testing having instructions that, when executed by a computer, cause the computer to perform a method comprising:

processing a plurality of manual test cases for an application under test;

associating a set of reusable test scripts to the plurality of manual test cases, wherein the set of reusable test scripts is selected from a library of reusable test scripts, wherein the library of reusable test scripts is in multiple levels for easy maintenance of the reusable test scripts; and executing the set of reusable test scripts for the application under test using the automated testing tool associated with the set of reusable test scripts.

19. A system embodied on a non-transitory computer-readable storage medium for lifecycle management of automated testing, the system comprising:

an administration module for performing administrative functions;

a report module for reporting on quality of automated testing projects and application under tests (AUT);

a project management module for centrally allocating available resources to the automated testing projects and managing progress of the automated testing projects;

a set of reusable test scripts comprising component codes used to create an automated test scenario of a plurality of manual test cases, wherein the set of reusable test scripts is selected from a library of reusable test scripts, and wherein the library of reusable test scripts is in multiple levels for easy maintenance of the reusable test scripts;

a requirement module for capturing technical requirements needed for the automated testing;

an analysis module for analyzing a user's responses to the technical requirements from the requirement module;

a design module for maintaining the set of reusable test scripts used for the automated testing;

a development module for building a test scenario for an application under test by associating the set of reusable test scripts to the plurality of manual test cases; and an execution module for executing the test scenario for the application under test using a licensed automated testing tool associated with the set of reusable test scripts.

* * * * *